(12) United States Patent
Schlamann

(10) Patent No.: US 8,011,713 B2
(45) Date of Patent: Sep. 6, 2011

(54) SEAT ARRANGEMENT FOR A MOTOR VEHICLE AND MOTOR VEHICLE WITH SUCH A SEAT ARRANGEMENT

(75) Inventor: Hermann-Walter Schlamann, Armsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 12/244,185

(22) Filed: Oct. 2, 2008

(65) Prior Publication Data

US 2009/0096244 A1 Apr. 16, 2009

(30) Foreign Application Priority Data

Oct. 11, 2007 (DE) .................. 10 2007 048 700

(51) Int. Cl.
*B60N 2/02* (2006.01)
(52) U.S. Cl. ............... 296/64; 296/65.11; 296/65.13; 296/65.16; 297/236
(58) Field of Classification Search ............ 296/64, 296/65.01, 65.11, 65.12, 65.13, 65.15, 65.14, 296/65.16, 65.17, 69; 297/234, 235, 236, 297/237, 257, 248, 344.12, 344.13
See application file for complete search history.

(56) References Cited

U.S. PATENT DOCUMENTS

| | | | |
|---|---|---|---|
| 6,129,405 A | 10/2000 | Miyahara et al. | |
| 6,899,367 B1 * | 5/2005 | Plavetich et al. | ......... 296/65.13 |
| 7,077,474 B2 * | 7/2006 | Satani | ............. 297/236 |
| 7,243,995 B2 | 7/2007 | Nakaya et al. | |
| 7,341,302 B2 | 3/2008 | Slade | |
| 7,490,896 B2 * | 2/2009 | Smith | ............. 297/235 |
| 7,578,536 B2 * | 8/2009 | Yajima et al. | ......... 296/65.03 |
| 7,578,551 B2 * | 8/2009 | Liñero | ............. 297/107 |
| 2005/0218683 A1 * | 10/2005 | Toyota et al. | ............. 296/64 |
| 2006/0076795 A1 * | 4/2006 | Slade | ............. 296/64 |
| 2007/0200384 A1 * | 8/2007 | Schwingenschloegel et al. | ............. 296/64 |
| 2008/0185893 A1 * | 8/2008 | Behrens et al. | ......... 297/378.1 |

(Continued)

FOREIGN PATENT DOCUMENTS

DE 4212091 A1 10/1993

(Continued)

OTHER PUBLICATIONS

Chinese Patent Office, Chinese Office Action for Chinese Application No. 200810169865.5, May 6, 2010.

(Continued)

*Primary Examiner* — Jason S Morrow
(74) *Attorney, Agent, or Firm* — Ingrassia Fisher & Lorenz, P.C.

(57) ABSTRACT

A seat arrangement is provided for a motor vehicle with a first vehicle seat and a second vehicle seat that is arranged adjacent to the first vehicle seat in the transverse direction. The vehicle seats include, but are not are not limited to a seat part and a back rest. The first vehicle seat can be displaced in the transverse direction from a first position into a second position in which the first vehicle seat is offset in the direction of the second vehicle seat. The second vehicle seat can furthermore be folded from a service position into an idle position. The seat part of the second vehicle seat is lowered in the idle position such that the seat part of the first vehicle seat is arranged above the seat part of the second vehicle seat in the second position.

14 Claims, 3 Drawing Sheets

U.S. PATENT DOCUMENTS

| | | | |
|---|---|---|---|
| 2009/0008975 A1* | 1/2009 | Behrens et al. | 297/236 |
| 2009/0195037 A1* | 8/2009 | Plavetich et al. | 297/257 |
| 2009/0236885 A1* | 9/2009 | Maier et al. | 297/257 |
| 2009/0250985 A1* | 10/2009 | Maier | 297/257 |
| 2009/0250986 A1* | 10/2009 | Maier et al. | 297/257 |
| 2009/0250987 A1* | 10/2009 | Maier | 297/257 |
| 2010/0007163 A1* | 1/2010 | Almeida et al. | 296/37.8 |

FOREIGN PATENT DOCUMENTS

| | | | |
|---|---|---|---|
| DE | 29512327 U1 | 9/1995 |
| DE | 19516913 A1 | 11/1996 |
| DE | 19717782 A1 | 11/1998 |
| DE | 20000479 U1 | 6/2001 |
| DE | 10238487 A1 | 5/2003 |
| DE | 10257162 A1 | 6/2004 |
| DE | 602004000159 T2 | 7/2006 |
| EP | 0331241 A2 | 9/1989 |
| EP | 0940288 A2 | 9/1999 |
| FR | 2884187 A1 | 10/2006 |
| FR | 2890911 A1 | 3/2007 |
| WO | 03095263 A2 | 11/2003 |

OTHER PUBLICATIONS

German Patent Office, German Search Report for German Application No. 102007048700.4, Apr. 11, 2008.

* cited by examiner

SEAT ARRANGEMENT FOR A MOTOR VEHICLE AND MOTOR VEHICLE WITH SUCH A SEAT ARRANGEMENT

CROSS-REFERENCE TO RELATED APPLICATION

This application claims priority to German Patent Application No. 102007048700.4, filed Oct. 11, 2007, which is incorporated herein by reference in its entirety.

TECHNICAL FIELD

The technical field relates to a seat arrangement for a motor vehicle with a first vehicle seat and a second vehicle seat that is arranged adjacent to the first vehicle seat in the transverse direction. These vehicle seats feature a seat part and a back rest. The first vehicle seat can be displaced in the transverse direction from a first position into a second position, in which the first vehicle seat is offset in the direction of the second vehicle seat, and the second vehicle seat can be folded from a service position into an idle position.

BACKGROUND

Various seat arrangements known from the state of the art serve for protecting the vehicle occupants during a side impact of the motor vehicle. For example, DE 42 12 091 A and DE 195 16 913 A describe seat arrangements with two vehicle seats that are arranged adjacent to one another. The two vehicle seats can be displaced in the longitudinal direction of the vehicle and are also guided on transverse rails. The transverse rails make it possible to displace the motor vehicle seat transverse to the longitudinal direction of the motor vehicle in case a side impact occurs. In such instances, the corresponding vehicle seat of the seat arrangement is displaced toward the center of the motor vehicle in order to prevent the vehicle occupant from being injured by the indented side wall of the motor vehicle.

In addition to the above-described seat arrangements, there also exist seat arrangements that make it possible to transversely displace the corresponding vehicle seat independently of a side impact in order to achieve a particularly flexible arrangement of the vehicle seats within the interior of the vehicle. For example, EP 0 940 288 B1 describes a seat arrangement that has two vehicle seats that can be independently displaced in the transverse or lateral direction of the motor vehicle. To this end, the motor vehicle floor is provided with transverse rails, in which corresponding guide elements of a substructure of the vehicle seats are guided. The substructure furthermore features longitudinal rails, in which guide elements of the corresponding motor vehicle seat are guided. A similar seat arrangement is also described in a DE 60 2004 000 159 T2.

The known seat arrangements for realizing a flexible arrangement of the corresponding vehicle seats have been tried and tested, but still have the disadvantage that a vehicle seat can only be conditionally displaced in the transverse direction because the displacement path is restricted by the other vehicle seat situated adjacent thereto. This means that a particularly flexible arrangement of the vehicle seats of known seat arrangements cannot be realized in the vehicle interior. In addition, the displacement mechanisms of the vehicle seats have a particularly elaborate design such that the installation of known seat arrangements is complicated.

In view of the foregoing, at least one objective exists for developing a seat arrangement for a motor vehicle with a first and a second vehicle seat that has a simple design and also allows a particularly flexible arrangement of the vehicle seats within the interior of the vehicle. In addition, embodiments aim to develop a motor vehicle with such an advantageous seat arrangement. Furthermore, other objectives, aims, desirable features, and characteristics will become apparent from the subsequent summary and detailed description, and the appended claims, taken in conjunction with the accompanying drawings and this background.

SUMMARY

In accordance with an embodiment of the invention, a seat arrangement for a motor vehicle includes, but is not limited to a first vehicle seat and a second vehicle seat. The second vehicle seat is arranged transversely adjacent to the first vehicle seat. In this case, the term transverse direction refers to the seating direction and, if applicable, also the vehicle direction. The first and the second vehicle seat respectively have, without limitation, a seat part and a back rest. The first vehicle seat can be displaced in the transverse direction from a first position into a second position, in which the first vehicle seat is offset in the direction of the second vehicle seat. This means that the first vehicle seat can be moved toward the second vehicle seat in the transverse direction. The second vehicle seat can furthermore be folded from a service position into an idle position. For example, the back rest of the second vehicle seat can be folded down on the seat part of the second vehicle seat. The embodiment of the invention proposes that the seat part of the second vehicle seat is lowered in the idle position such that the seat part of the first vehicle seat is arranged above the seat part of the second vehicle seat in the second position.

Since the seat part of the first vehicle seat can be displaced above the lowered seat part of the second vehicle seat by displacing the first vehicle seat into the second position without causing a collision between the seat parts that impairs the displacement, a particularly long displacement path of the first vehicle seat is realized in the transverse direction. This allows a particularly flexible arrangement of the first vehicle seat within the interior of the vehicle.

In one preferred embodiment, the back rest of the first vehicle seat has a section that protrudes over the side of the seat part of the first vehicle seat in the direction of the second vehicle seat. The seat part of the second vehicle seat also has a section that protrudes over the side of the back rest of the second vehicle seat in the direction of the first vehicle seat. In the idle position of the second vehicle seat, the back rest thereof is folded down on the seat part of the second vehicle seat such that its back rest points upward. In this embodiment, the laterally protruding section of the back rest of the first vehicle seat is arranged above the rear side of the back rest of the second vehicle seat in the second position. Due to the laterally protruding sections and the corresponding recesses on the respectively opposite side, it is possible to displace the first vehicle seat into the second position without causing its back rest or its seat part to prematurely collide with the back rest of the second vehicle seat and thusly shortening the displacement path of the first vehicle seat in the transverse direction.

In another preferred embodiment, the back rest of the first vehicle seat in the first position laterally adjoins the back rest of the second vehicle seat in the service position thereof. Due to this measure, the two back rests form one common back rest that prevents persons from reaching or falling through. In this case, the surfaces of the two back rests that face the vehicle occupants are preferably arranged in one plane and form a coherent back rest surface.

In another embodiment, the seat part of the first vehicle seat in the first position laterally adjoins the seat part of the second vehicle seat in the service position thereof in this particular embodiment.

According to another embodiment, the seat part of the first vehicle seat laterally adjoins the seat part of the second vehicle seat such that a coherent seating surface is formed. The seating surface of the seat part of the first vehicle seat and the seating surface of the seat part of the second vehicle seat are preferably arranged in one plane. The thusly adjoining seat parts provide the vehicle occupant with a broad freedom of motion, as well as the option of a relatively free choice of the seating position on the coherent seating surface.

In another embodiment, the seat part of the first vehicle seat in the second position laterally adjoins the back rest of the second vehicle seat in the idle position thereof. Consequently, the back rest of the second vehicle seat serves as a stop for the movement of the first vehicle seat into its second position. Since the seat part of the first vehicle seat laterally adjoins the back rest of the second vehicle seat, it is ensured that the aforementioned components do not form a gap, into which objects could fall.

In one particularly embodiment, the seat part of the first vehicle seat laterally adjoins the back rest of the second vehicle seat such that a coherent seating surface is formed. The coherent seating surface is composed of the seating surface of the seat part of the first vehicle seat and the rear side of the back rest of the second vehicle seat. This makes it possible to also provide the vehicle occupants with a particularly large and coherent seating surface when the second vehicle seat is in the idle position and the first vehicle seat is in the second position.

In one embodiment, a third vehicle seat with one or more characteristics of the first vehicle seat is also provided. The third vehicle seat is arranged transversely adjacent to the second vehicle seat on the side that points away from the first vehicle seat. Since the third vehicle seat has one or more characteristics of the first vehicle seat, it can also be displaced into a second position in the transverse direction, wherein the displacement path in the transverse direction is particularly long for the above-described reasons.

In one particularly embodiment, the back rests of the first and the third vehicle seat laterally adjoin one another in the second position. This means that the two back rests of the first and the third vehicle seat form a common, coherent back rest without a gap that would prevent the occupant from leaning back comfortably and allow objects to fall through.

In another embodiment, the first vehicle seat and/or the third vehicle seat is/are arranged on a common carrier part that is arranged in the motor vehicle in a longitudinally displaceable fashion together with the second vehicle seat. Although a carrier part is provided for each individual vehicle seat in conventional seat arrangements, at least two vehicle seats are arranged on a common carrier part in this embodiment. In comparison with several individual carrier parts, one common carrier part requires fewer longitudinal guides within the motor vehicle such that the design of the inventive seat arrangement is significantly simplified in this embodiment. This not only ensures a simple installation of the seat arrangement, but the smaller number of components, namely the number of longitudinal guides, also allows a space-saving arrangement in the interior of the vehicle.

In another embodiment, the first vehicle seat and/or the third vehicle seat is/are arranged on the carrier part in a transversely displaceable fashion.

According to another embodiment, the second vehicle seat is immovably arranged on the carrier part. Since the seat part of the second vehicle seat is in the idle position situated underneath the seat part of the first vehicle seat in the second position thereof, a transverse displacement of the second vehicle seat along the carrier part is no longer required such that the design is additionally simplified.

In order to provide a higher level of comfort for the vehicle passengers seated behind the seat arrangement, the carrier part according an embodiment is designed such that a footwell is formed between the carrier part and the vehicle floor and accessible from the rear.

In order to create the aforementioned footwell that is accessible from the rear, the carrier part according to an embodiment seat arrangement features a front and a rear transverse rail for the transverse displacement of the first and/or third vehicle seat. The rear transverse rail is arranged higher than the front transverse rail. Since the rear transverse rail is arranged higher than the front transverse rail, the vehicle occupant on the rear seat is able to place his feet into the region between the rear transverse rail and the vehicle floor.

In order to also create a large cargo space within the motor vehicle, the first vehicle seat and/or the third vehicle seat according to an embodiment can be folded from a service position into an idle position, in which the rear side of the back rest of the first and/or the third vehicle seat forms a coherent cargo surface together with the rear side of the back rest of the second vehicle seat in the idle position thereof. The rear sides of the back rests are preferably arranged in a horizontal plane such that no gap remains between the individual rear sides.

A motor vehicle is also provided that includes, but is not limited to the seat arrangements of the foregoing embodiments. In one preferred embodiment of the inventive motor vehicle, the seat arrangement forms the second row of seats of the motor vehicle.

In one particularly preferred embodiment of the motor vehicle, the interior of the vehicle features a first longitudinal section with a predetermined width and an adjacent second longitudinal section with a reduced width. In this embodiment, the vehicle seats are designed in such a way that the first and/or third vehicle seat can only be displaced from the first longitudinal section into the second longitudinal section when the first and/or third vehicle seat is/are in the second position. The aforementioned second longitudinal section of reduced width may consist, for example, of the longitudinal section of the motor vehicle, in which the width of the vehicle interior is reduced due to the inwardly protruding wheel housings. This seat arrangement makes it possible to also displace the vehicle seats into this second longitudinal section. Consequently, a particularly flexible arrangement of the vehicle seats can be realized in the interior of the motor vehicle, namely even if only little space is available in a few longitudinal sections of the vehicle interior.

BRIEF DESCRIPTION OF THE DRAWINGS

The embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
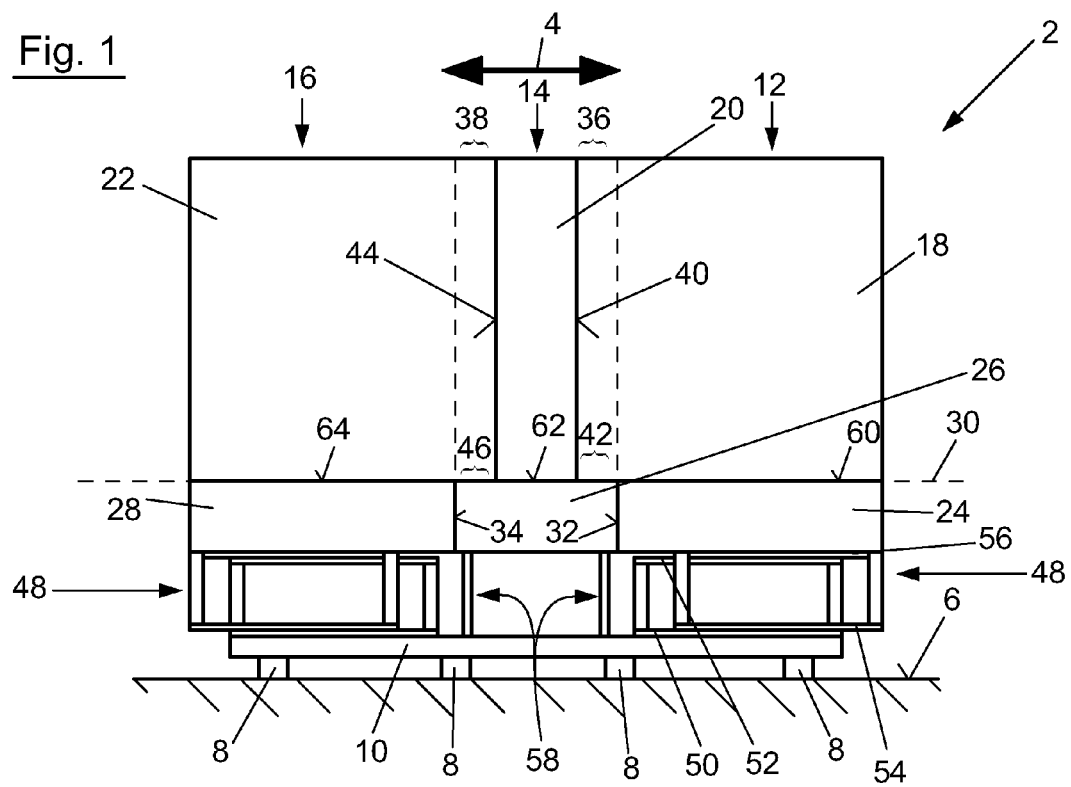
FIG. 1 shows a front view of a first embodiment, in which the first and the third vehicle seat are in the first position and the second vehicle seat is in the service position.

FIG. 1 shows a first embodiment of the seat arrangement 2. The seat arrangement 2 forms the second row of seats of the motor vehicle as elucidated below with reference to FIG. 5. The longitudinal direction of the motor vehicle and the seating direction of the seat arrangement 2 correspond to the vertical or normal of the sheet of drawings while the transverse direction 4 is indicated by the double arrow.

The vehicle floor 6 facing the interior of the vehicle is provided with four longitudinally extending guide rails 8 that are arranged parallel to and spaced apart from one another in the transverse direction 4. A common carrier part 10 is guided on the guide rails 8 such that it can be displaced in the longitudinal direction. A first vehicle seat 12, a second vehicle seat 14, and a third vehicle seat 16 are arranged on the common carrier part 10. The vehicle seats 12, 14, 16 comprise a back rest 18, 20, 22 and a seat part 24, 26, 28. The back rests 18, 20, 22 can be respectively pivoted forward on the seat part 24, 26, 28 about a pivoting axis 30 that extends in the transverse direction 4. The second vehicle seat 14 is arranged adjacent to the first vehicle seat 12 in the transverse direction 4. The third vehicle seat 16 is arranged adjacent to the second vehicle seat 14 in the transverse direction 4 on the side that points away from the first vehicle seat 12.

The back rests 18, 22 of the first and the third vehicle seat 12, 16 are realized wider than the corresponding seat parts 24, 28 such that the back rest 18, 22 respectively feature a section 36, 38 that protrudes over the side 32, 34 of the seat part 24, 28 in the direction of the second vehicle seat 14. The second vehicle seat 14, in contrast, features a back rest 20 that is realized narrower than the corresponding seat part 26. Consequently, the seat part 26 of the second vehicle seat 14 features a section 42 that protrudes over one side 40 of the back rest 20 of the second vehicle seat 14 and extends in the direction of the first vehicle seat 12, as well as a section 46 that protrudes over the side 44 of the back rest 20 in the direction of the third vehicle seat 16 and extends in the direction of the third vehicle seat 16.

The first vehicle seat 12 and the third vehicle seat 16 are respectively arranged on the carrier part such that they can be respectively displaced in the transverse direction 4 by means of a sliding mechanism 48. The sliding mechanism 48 features two transverse rails on the side of the carrier part. A front transverse rail 50 and a rear transverse rail 52 are provided in this embodiment. The rear transverse rail 52 is arranged higher than the front transverse rail 50 such that a footwell between the rear transverse rail 52 of the carrier part 10 and the vehicle floor is accessible from the rear. Corresponding guide elements 54, 56 are mounted on the seat part 24, 28 of the vehicle seat 12, 16 and guided on the transverse rails 50, 52.

The second vehicle seat 14 is mounted on the carrier part 10 with the aid of a simple lever mechanism 58. The mounting is realized such that the second vehicle seat 14 is immovably arranged on the carrier part 10. The lever mechanism 58 makes it possible to lower the seat part 26 of the second vehicle seat 14 as described below with reference to FIG. 1 to FIG. 2.

Other characteristics of the seat arrangement 2 and the function thereof are described below with reference to FIG. 1 to FIG. 5. In FIG. 1, the second vehicle seat 14 is in a service position, in which the back rest 20 is essentially oriented upright and a vehicle passenger can be seated on the seat part 26 of the second vehicle seat 14. The first vehicle seat 12 and the third vehicle seat 16 are in a first position in FIG. 1. The protruding sections 36, 38 of the back rests 18, 22 of the vehicle seats 12, 16 adjoin the sides 40, 44 of the back rest 20 of the second vehicle seat 14. In addition, the sides 32, 34 of the seat parts 24, 28 of the vehicle seats 12, 16 laterally adjoin the seat part 26 of the second vehicle seat 14. Consequently, a continuous back rest and a continuous seat part are formed. The seating surfaces 60, 62, 64 of the seat parts 24, 26, 28 form one coherent seating surface that is arranged in one plane.

Figure 2:
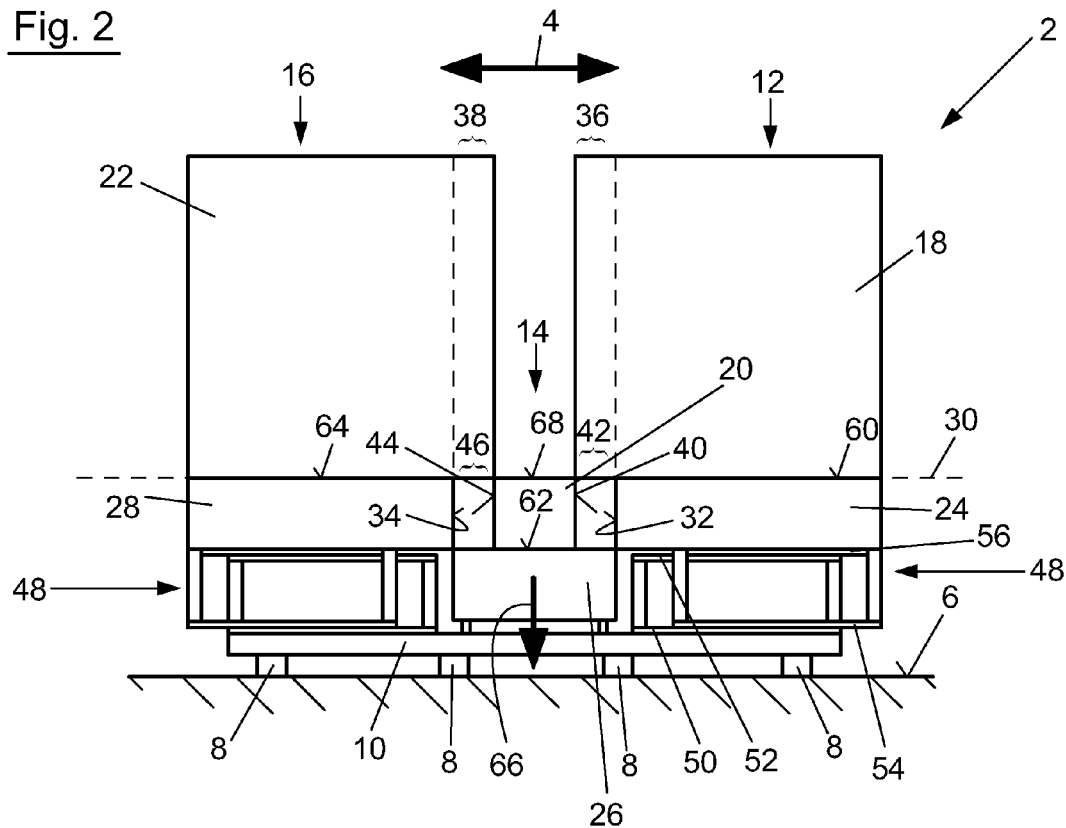
FIG. 2 shows the seat arrangement according to FIG. 1 with the second vehicle seat in the idle position.

The first and the third vehicle seat 12, 16 can be displaced in the transverse direction 4 as described below. The back rest of the second vehicle seat 14 is initially pivoted forward on the seat part 26 about the pivoting axis 30 as indicated in FIG. 2. In this case, the pivoting movement of the back rest 20 is coupled to the lever mechanism 58 in such a way that the seat part 26 of the second vehicle seat 14 is lowered in the direction of the vehicle floor 6 as indicated by the arrow 66 in FIG. 2. The second vehicle seat 14 is now folded into the idle position illustrated in FIG. 2. The rear side 68 of the back rest 20 points upward in the idle position.

Figure 3:
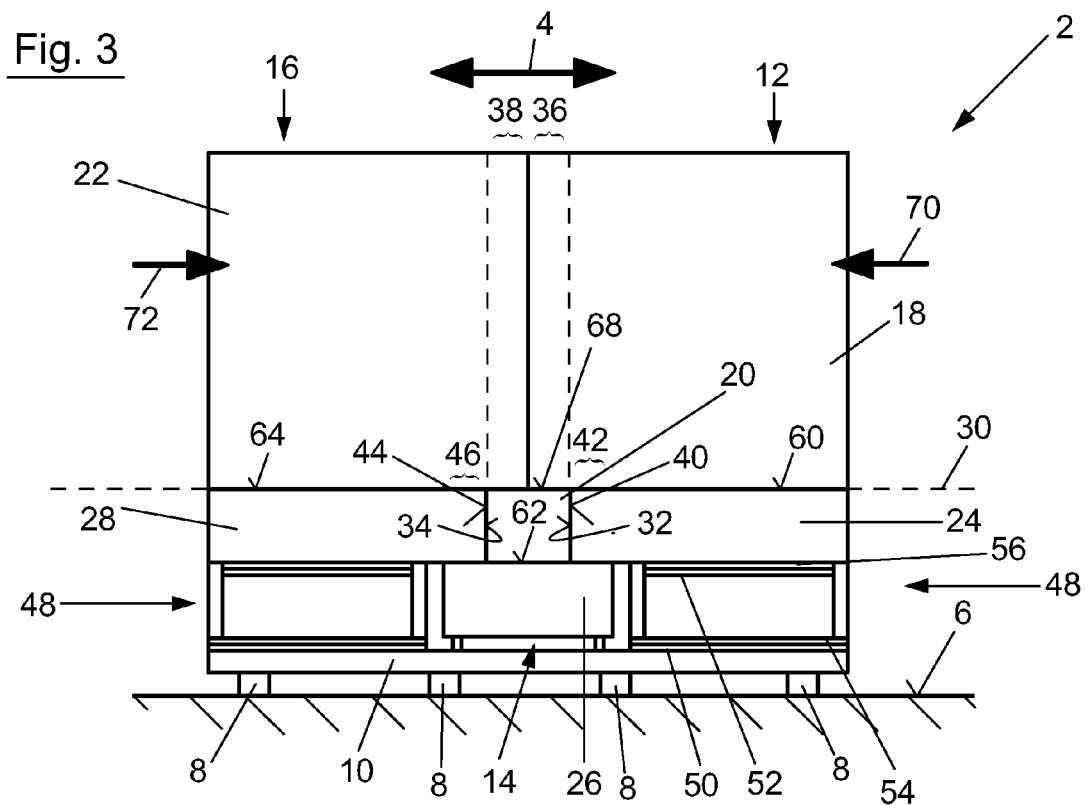
FIG. 3 shows the seat arrangement according to FIG. 2 with the first and the third vehicle seat in the second position.

Subsequently, the two vehicle seats 12, 16 can be displaced into a second position in the transverse direction 4 by means of the displacement mechanism 48 as shown in FIG. 3. In the second position, the first and the third vehicle seat 12, 16 are offset inward into the motor vehicle in the direction of the second vehicle seat 14. In this second position, the seat parts 24, 28 of the first and the third vehicle seat 12, 16 are at least partially pushed over the seat part 26 of the second vehicle seat 14. The sides 32, 34 of the seat parts 24, 28 adjoin the sides 40, 44 of the back rest 20 in such a way that the seating surfaces 60, 64 of the seat parts 24, 28 and the rear side 68 of the back rest 20 form a coherent seating surface that extends in one plane. The protruding sections 36, 38 of the back rest 18, 22 of the first and the third vehicle seat 12, 16 laterally adjoin one another in the second position. The protruding sections 36, 38 are pushed over the rear side 68 of the back rest 20 of the second vehicle seat 14. The movements of the first and the third vehicle seat 12, 16 into the second position are indicated by the arrows 70, 72 in FIG. 3.

Figure 4:
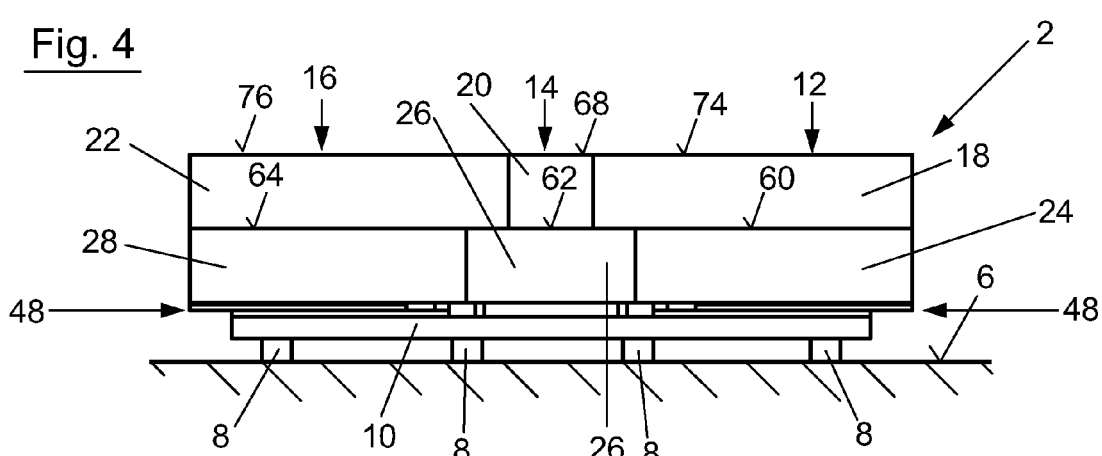
FIG. 4 shows the seat arrangement according to FIG. 1 with the first, second and third vehicle seat in the idle position.

According to FIG. 4, the first and the third vehicle seat 12, 16 can furthermore be folded from the service position according to FIG. 1 into an idle position. For this purpose, the back rests 18, 22 are folded forward on the corresponding seat parts 24, 28 about the pivoting axis 30 analogous to the back rest 20 of the second vehicle seat 14. In the idle position, the rear sides 74, 76 of the back rests 18, 22 form a coherent cargo area that preferably extends in a horizontally aligned plane together with the rear side 68 of the back rest 20 of the second vehicle seat 14. Analogous to the second vehicle seat 14, the seat parts 24, 28 are also lowered in the direction of the vehicle floor 6 during the pivoting movements of the back rests 18, 22.

Figure 5:
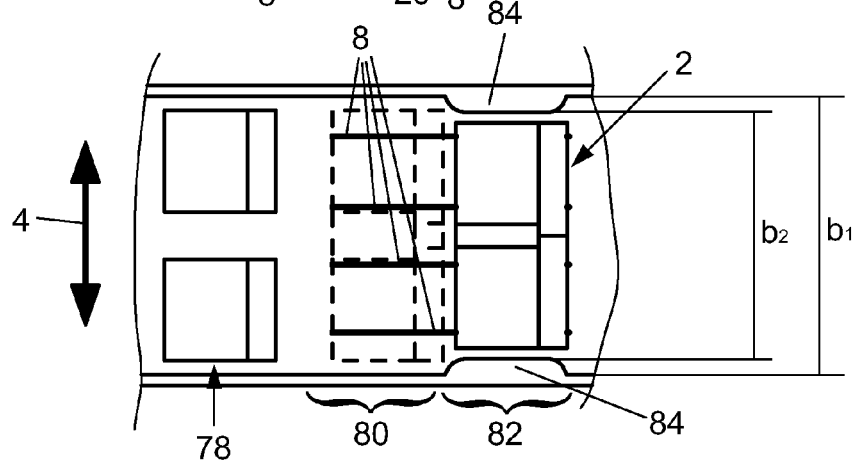
FIG. 5 shows a top view of the vehicle interior with the seat arrangement according to FIG. 1 to 4.

FIG. 5 shows a top view of the interior of a vehicle with the seat arrangement 2 shown according to FIG. 1 to FIG. 4. The seat arrangement 2 forms the second row of seats that is arranged behind a first row of seats 78 in a motor vehicle. The vehicle interior features a first longitudinal section 80 with a predetermined with b1 and an adjacent second longitudinal section 82 that has a reduced width b2 in the transverse direction 4. In this case, the reduced width b2 is caused by the wheel housings 84 that laterally protrude into the interior of the vehicle.

When the seat arrangement 2 is in the position illustrated in FIG. 1, it has an overall width that prevents the seat arrangement 2 from being displaced from the first longitudinal section 80 into the second longitudinal section 82 as indicated by the illustration drawn with broken lines. However, after the seat arrangement 2 is configured as shown in FIG. 3, its width is reduced such that the carrier part 10 can be displaced from the first longitudinal section 80 into the second longitudinal section 82 along the guide rail 8 together with the vehicle seats 12, 14, 16 mounted thereon, namely without colliding with the wheel housings 84.

Figure 6:
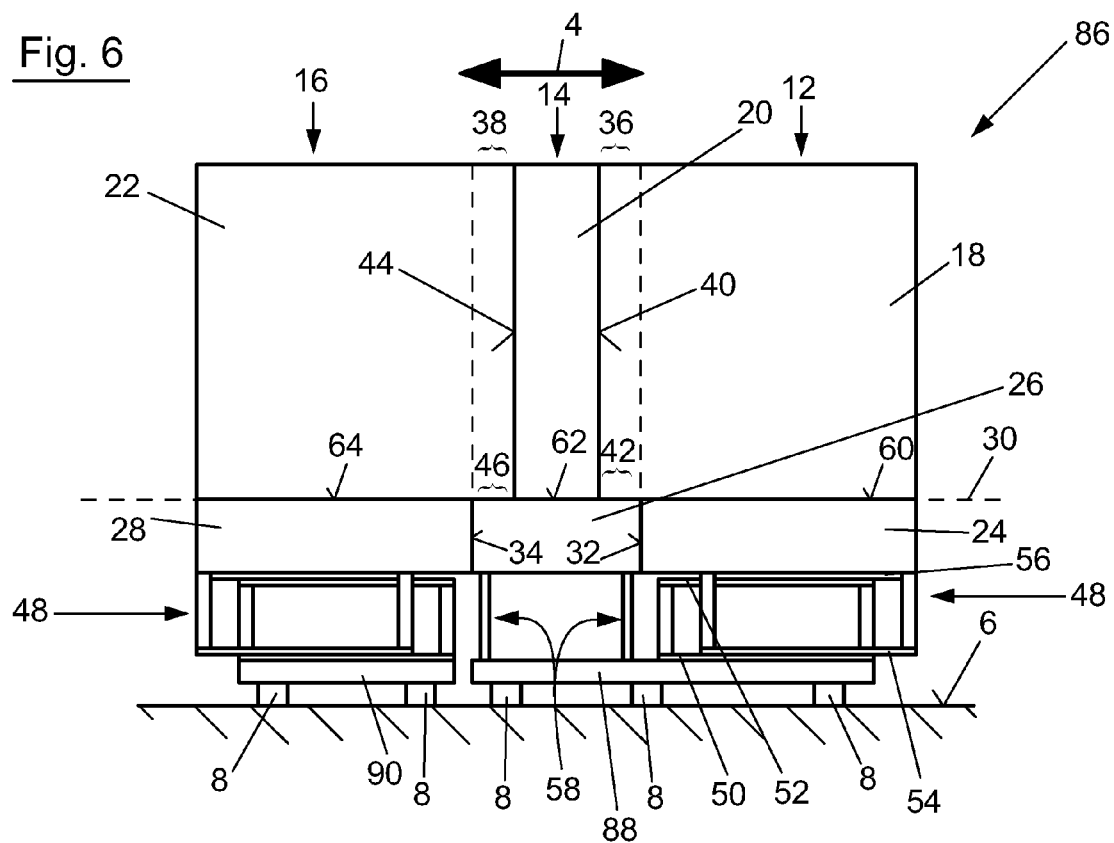
FIG. 6 shows a front view of a second embodiment, in which the first and the third vehicle seat are in the first position and the second vehicle seat is in the service position.

FIG. 6 shows a second embodiment of the seat arrangement 86 that essentially corresponds to the first embodiment such that only the differences in comparison with the first embodiment are discussed and identical or similar components are identified by the same reference symbols, wherein the preceding description of FIG. 1 to FIG. 5 applies accordingly in this respect.

In contrast to the first embodiment, the seat arrangement 86 comprises two carrier parts 88, 90 instead of one common carrier part 10. The vehicle seats 12, 14 are arranged on the carrier part 88 while the third vehicle seat 16 is arranged on a carrier part 90 that is realized independently and separately of the first carrier part 88. Although this arrangement uses one more guide rail 8 on the vehicle floor 6 than in the first embodiment, the third vehicle seat 16 can be advantageously displaced in the longitudinal direction independently of the two other vehicle seats 12, 14. With respect to the carrier part 88, it is furthermore advantageous that only three guide rails 8 are used instead of four guide rails due to the arrangement of both vehicle seats 12, 14 on the carrier part 88.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A seat arrangement for a motor vehicle, comprising:
   a first vehicle seat; and
   a second vehicle seat adjacent to the first vehicle seat in a transverse direction,
   a seat part for the first vehicle seat and the second vehicle seat; and
   a back rest for the first vehicle seat and the second vehicle seat;
   wherein the first vehicle seat can be displaced in a transverse direction from a first position into a second position in which the first vehicle seat is offset in a direction of the second vehicle seat,
   wherein the second vehicle seat can be folded from a service position into an idle position, and
   wherein the seat part of the second vehicle seat is lowered in the idle position such that the seat part of the first vehicle seat is arranged above the seat part of the second vehicle seat in the second position; and
   wherein the back rest of the first vehicle seat comprises a section that protrudes over a side of the seat part of the first vehicle seat in the direction of the second vehicle seat, and the seat part of the second vehicle seat comprises a section that protrudes over the side of the back rest of the second vehicle seat in the direction of the first vehicle seat, wherein the back rest of the second vehicle seat is folded on the seat part of the second vehicle seat in the idle position such that a rear side points upward, and wherein the section of the back rest of the first vehicle seat is arranged above the rear side of the back rest of the second vehicle seat in the second position.

2. The seat arrangement according to one of claim 1, wherein the back rest of the first vehicle seat in the first position laterally adjoins the back rest of the second vehicle seat in the service position.

3. The seat arrangement according to claim 1, wherein the seat part of the first vehicle seat in the first position laterally adjoins the seat part of the second vehicle seat in the service position.

4. The seat arrangement according to claim 3, wherein the seat part of the first vehicle seat laterally adjoins the seat part of the second vehicle seat such that a coherent seating surface is formed.

5. The seat arrangement according to claim 1, wherein the seat part of the first vehicle seat in the second position laterally adjoins the back rest of the second vehicle seat in the idle position.

6. The seat arrangement according to claim 5, wherein the seat part of the first vehicle seat laterally adjoins the back rest of the second vehicle seat such that a coherent seating surface is formed, wherein the coherent seating surface is composed of a seating surface of the seat part of the first vehicle seat and the rear side of the back rest of the second vehicle seat.

7. The seat arrangement according to claim 1, further comprising a third vehicle seat arranged adjacent to the second vehicle seat in the transverse direction, the third vehicle seat having a back rest.

8. The seat arrangement according to claim 7, wherein the back rest of the first vehicle seat and the back rest of the third vehicle seat laterally adjoin one another in the second position.

9. The seat arrangement according to claim 7, wherein at least the first vehicle seat or the third vehicle seat are arranged on a common carrier part that can be longitudinally displaced in the motor vehicle together with the second vehicle seat.

10. The seat arrangement according to claim 9, wherein at least the first vehicle seat or the third vehicle seat is arranged on the common carrier part in a transversely displaceable fashion.

11. The seat arrangement according to claim 9, wherein the second vehicle seat is arranged on the common carrier part such that it is immovable in the transverse direction.

12. The seat arrangement according to one of claims 10, wherein the common carrier part is designed such that a footwell is formed between the common carrier part and a vehicle floor.

13. The seat arrangement according to claim 12, wherein the carrier part features a front and a rear transverse rail in order to transversely displaced at least the first or the third vehicle seat, wherein the rear transverse rail is arranged higher than a front transverse rail.

14. The seat arrangement according to claim 7, wherein at least the first vehicle seat or the third vehicle seat can be folded from a service position into the idle position in which the rear side of the back rest of the first vehicle seat or third vehicle seat forms a coherent cargo area together with the rear side of the back rest of the second vehicle seat in the idle position.

* * * * *